Dec. 15, 1936.   A. D. EVANS   2,064,467
MEASURING DEVICE
Filed May 24, 1932   2 Sheets-Sheet 1
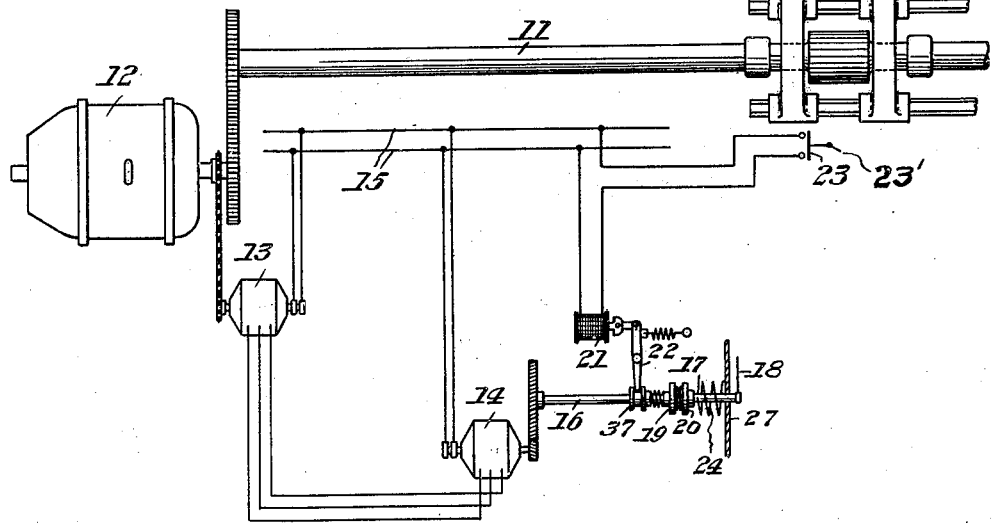
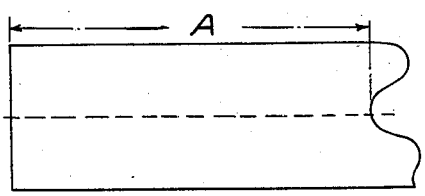
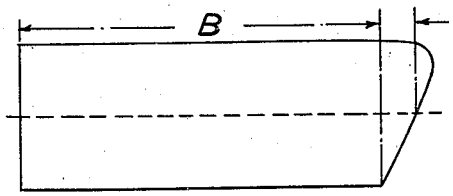
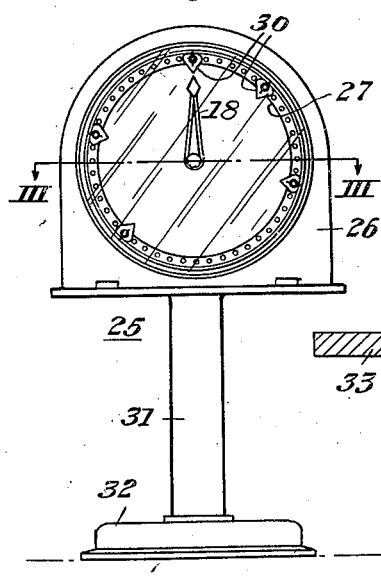
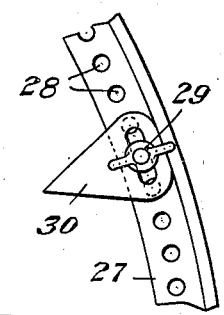
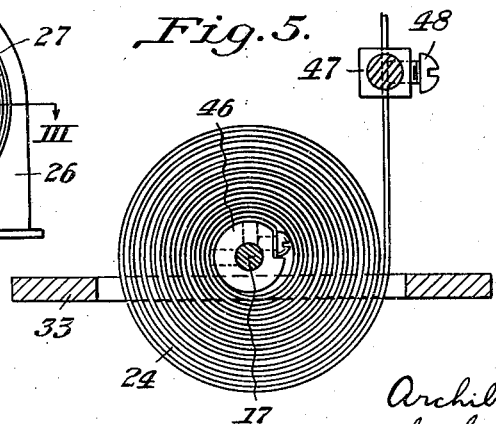
INVENTOR
Archibald D. Evans
by his attorneys
Byrnes, Stebbins, Parmelee & Blenko Dec. 15, 1936.   A. D. EVANS   2,064,467
MEASURING DEVICE
Filed May 24, 1932   2 Sheets-Sheet 2

INVENTOR
Archibald D. Evans
by his attorneys
Byrnes, Stebbins, Parmelee & Blenko Patented Dec. 15, 1936

2,064,467

UNITED STATES PATENT OFFICE 2,064,467

MEASURING DEVICE

Archibald D. Evans, Warren, Ohio, assignor to The Wean Engineering Company, Incorporated, Warren, Ohio, a corporation of Ohio Application May 24, 1932, Serial No. 613,167

5 Claims. (Cl. 33—141)

My invention relates to the measurement of the length of material while in motion and, in particular, to the measurement of the length of packs being rolled in a sheet mill, although not in any way limited to such application.

In the past, it has been the practice in mills manufacturing steel sheets and tin plate to determine the gauge or thickness of hot rolled material by measuring its length. Since the sheet bars with which the sheet rolling operation is started are elongated in one direction only, the length of the material bears a constant relation to its thickness or gauge. The advantage of measuring the length to determine the gauge is, obviously, that it is much more accurate and is also considerably easier.

The prior method of measuring packs being rolled is by the use of a graduated steel measuring rod which is applied directly to the packs, generally after they have been finished. This method is useful only as a check to insure that the pack has been sufficiently elongated. It does not guard against insufficient or excessive elongation of the pack, since the adjustment of the rolls and the resulting elongation is controlled entirely by the roller or operator in charge of the mill, based upon his experience and observation. The objection to insufficient or excessive elongation of the pack is obvious. In most cases, purchasers of sheets insist that the product gauge between certain narrow limits and any variation therefrom results in rejections. Insufficient or excessive elongation, however, is objectionable for other reasons also. If a pack has been subjected to excessive elongation, the sheets thereof will not only gauge below the desired thickness but the scrap losses represented by the sheared ends of the pack are increased or, in other words, a smaller proportion of the useful metal is included in the finished product. In the case of insufficient elongation of the packs, the scrap loss is a minimum but the gauge is heavy. The chief objection, however, is that the required size of sheets cannot be sheared from a short pack. The only alternative, therefore, is to shear the pack into sheets of the next smaller standard size and stock them in the hope that they can be disposed of on some other order. Generally, sheet mill rolling schedules are based on the orders for the finished product; in other words, it is not usual to roll different sizes of sheets for stock. It is therefore desirable to convert the maximum percentage of raw material into the finished product which will meet the specifications of the purchaser's order. This is particularly important because steel sheets are sold on a tonnage basis and anything which decreases the percentage by weight of the raw material converted into a salable finished product represents a direct loss. The tendency on the part of the roller, furthermore, is to over-elongate the packs because he is penalized more severely for "cut-downs" resulting from short packs than for excessive scrap resulting from excessively elongated packs.

The old method of measuring pack lengths as a final check is also undesirable because of the time delay in the mill operation which it necessitates. For this reason, the rollers do not check every pack length because they are paid on a tonnage basis and it may happen that the lengths of successive packs vary widely without any check whatever being made until a pack is cold and ready to be sheared. If a check of the pack length indicates it is too short, it can be elongated slightly by repassing it through the rolls after it has cooled sufficiently to prevent excessive elongation. The time lost while waiting for the pack to cool is often sufficient to roll two or three other packs.

It is to be noted that uniformity of product both as to length and gauge cannot be insured merely by subjecting each pack to the same number of passes with identical roll settings. This is because of the facts that the actual temperatures of successive packs differ, screwdown settings cannot be exactly duplicated, and variations in the thickness of the rough rolled breakdowns forming the packs fed to the finishing mill are inevitable. These several variables make it impossible to establish any standards of practice and as a result, it has been necessary for the roller to rely on his skill and experience to approximate as closely as possible the desired dimensions of the pack. The present invention makes it possible for the roller to know exactly the length of the pack at every step in the finish rolling operation. All guess work and approximation is thus eliminated. No lost time is necessary to check the pack length and the roller is enabled after each pass to set his screwdown properly for the next pass so that any deficiency or excess of length produced by the preceding pass can be compensated for.

In accordance with the invention, I provide means which moves at a speed proportional to the peripheral speed of the mill rolls for the interval during which the material is between the rolls. Thus an accurate measurement of the pack length is provided for the roller by means of an indicating dial which may be provided with markers to indicate the proper length of pack after each successive pass. The indicating mechanism is driven by means connected with the main mill drive and is operatively associated therewith during the actual rolling interval by electromagnetic means controlled by the pack traversing the pass.

For a complete understanding of the invention, reference is made to the accompanying drawings illustrating a present preferred embodiment of the invention, although it is to be understood that various changes and modifications in the embodiment described may be made without departing from the scope of my broader claims. In the drawings:—

Figure 1 is a diagrammatic view illustrating the invention schematically;

Figure 2 is a front elevation of the roller's indicating mechanism;

Figure 5 is a sectional view along the line V—V of Figure 4;

Figure 6 is an enlarged view of a detail;

Figure 7 is a diagram illustrating the shape of a pack for a certain condition of the rolls; and Figure 8 is a similar view showing the shape of the pack resulting from a different roll contour.

Figure 3:
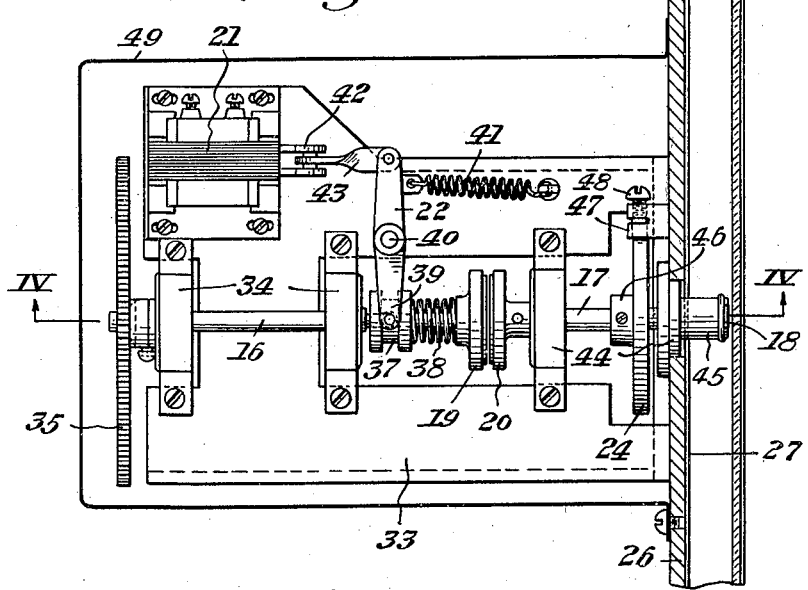
Figure 3 is a sectional view taken along the line III—III of Figure 2 showing the drive for the indicator in plan.
Figure 4:
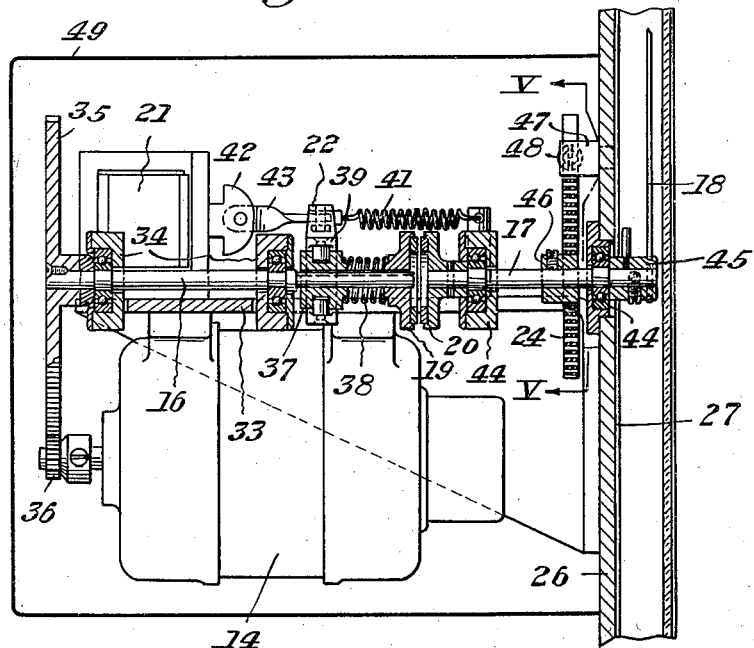
Figure 4 is a sectional view along the line IV—IV of Figure 3.

Referring now in detail to the drawings, and for the present, to Figure 1, a rolling mill is indicated in plan at 10. The rolls of the mill 10 are driven through a spindle 11 by a main mill motor 12 geared thereto. The motor 12, in addition to driving the spindle 11, drives a polyphase synchronous alternating current machine 13 which acts as a transmitter for supplying energy to a similar machine 14 operating in synchronism therewith and serving as a receiver. Both machines 13 and 14 receive excitation from a supply circuit 15. The receiver 14 is geared to a shaft 16. A coaxial shaft 17 is provided with an indicator 18. Clutch members 19 and 20 permit the shafts 16 and 17 to be coupled so that the indicator 18 is driven at a speed proportional to that of the rolls of the finishing mill. A clutch-operating magnet 21 operates through a lever 22 to actuate the movable clutch member 19. The magnet 21 is controlled by a flag switch 23 having a target 23' in the path of the packs emerging from the mill 10. The flag switch may be located in any convenient position, preferably as close as possible to the mill.

It will be obvious from the foregoing that the shaft 16 is driven continuously at a speed proportional to that of the mill rolls through the driving mechanism described. During the interval in which a pack is between the rolls of the mill 10, the magnet 21 is energized to engage the clutch members 19 and 20. The indicator 18, therefore, travels at a speed proportional to the peripheral speed of the mill for a time interval corresponding to that during which the pack is between the rolls. The total movement of the indicator, therefore, is proportional to the product of the peripheral speed of the mill and the time during which a pack is between the mill rolls. This product, of course, is the length of the pack which is communicated to the roller by his merely observing the indicator. A spring 24 serves to return the indicator 18 to a predetermined initial position as soon as the clutch-shifting magnet 21 is deenergized by the passage of the pack out of the mill, whereby the switch 23 is opened.

A detailed description of the parts of the invention will now be given, using reference numerals corresponding to those already employed to indicate similar members.

The indicating mechanism indicated generally by the numeral 25 comprises a face plate 26 having a glazed dial 27 with which the indicator 18 cooperates. As shown more particularly in Figure 6, the dial rim is provided with a plurality of tapped holes 28 for receiving thumb screws 29 to secure adjustable markers 30 in different positions around the dial. The face plate 26 is supported on a standard 31 and a base 32.

A bearing plate 33 forming a supporting shelf for apparatus about to be described is mounted behind the face plate 26. Below the shelf the receiver unit 14 is suspended for driving the shaft 16. The shaft 16 is journaled in bearings 34 and is provided with a gear 35 meshing with a pinion 36 on the shaft of the receiver unit 14.

The clutch member 19 is splined to the projecting end of the shaft 16, as is a collar 37. A spring 38 connects the collar and the clutch member. The lever 22 is provided with a fork 39 engaging the collar 37. The lever 22 is pivoted at 40 on the plate 33. A tension spring 41 normally maintains the lever 22 in clutch-retracting position. The clutch-shifting magnet 21 operates a yoke 42 connected to the lever 22 by a link 43. The indicator shaft 17 is journaled in bearings 44 coaxially with the shaft 16. The clutch member 20 is pinned to the shaft 17 for cooperation with the clutch member 19. The indicator 18 is secured to the shaft 17 by means of a bushing 45. The resetting spring 24 has one end secured to a bushing 46 on the shaft 17, the other end being adjustably engaged between an abutment 47 on the rear of the face plate 26 and a set screw 48 threaded thereinto.

A cover 49 for the mechanism driving the indicator is preferably removably attached to the rear of the base plate 26.

Having described the apparatus constituting an embodiment of the invention, the method of operation will now be briefly reviewed and the advantages of the invention in actual practice pointed out.

When a pack of sheets has been heated to the proper rolling temperature, it is advanced to the finishing mill 10 and entered therein. The rolls of the mill 10 are driven continuously at a substantially constant speed by the motor 12. The pack is preferably entered between the rolls and automatically returned thereover after the first pass for successive reductions by automatic means, such as the feeding and catching tables described and claimed in the co-pending applications of McIlvried, Moore and Peterson, Serial No. 581,202, filed December 15, 1931, for Rolling sheets and packs, and Wean and Evans, Serial No. 605,599, filed April 16, 1932, for Feeding and catching table now Patent #1,974,403, Sept. 18, 1934. In that case, the flag switch 23 may be actuated by the same mechanism which operates the switches controlling the movements of the catching table. This mechanism is located on the end of the table as close to the rolls as possible.

The shaft 16 of the indicator mechanism, of course, turns constantly at a speed proportional to that of the main mill drive and the clutch members 19 and 20 are normally disengaged by the spring 41. As soon as the pack enters the mill, however, and the leading end thereof closes the flag switch 23, the clutch-shifting magnet 21 is energized so that the shaft 17 is driven with the shaft 16. The indicator 18, thereupon moves from its zero position illustrated in Figure 2 through an angle which is proportional to the length of the pack, as previously explained.

For different dimensions of finished product, the roller knows approximately what length the packs should have at the end of each successive pass. He will, therefore, adjust the markers 30 around the rim of the dial 27 to conform to the desired lengths of packs after each of the necessary passes. It will be the roller's aim, furthermore, to adjust his screwdown so that the indicator 18 will advance into alignment with the marker corresponding with the pass being effected. As long as the flag switch 23 is closed, the magnet 21 remains energized and the indicator 18 moves around its dial.

As soon as the pack passes completely out of the rolls and the switch 23 is opened, however, the magnet 21 is deenergized. The clutch members 19 and 20 are thereupon disengaged and the retracting spring 17, which is wound up as the indicator 18 advances, operates to reset the indicator to the zero position illustrated at Figure 2, which is determined by any suitable stop. By observing the indicator 18 as the pack passes out of the rolls, the roller can determine whether the length of the pack after that particular pass is equal to or greater or less than the pack length which he has determined by experience should be produced after such pass to give the desired character of finished product. If the pack length measures up short, the roller will adjust the rolls for the next pass accordingly so that any deficiency in pack length will be compensated in the next pass. The same compensation can be made if, after one pass, the pack length is greater than it should be.

The roller thus has definite information as to the length of each pack after each pass through the rolls and this information is obtained merely by glancing at the indicator 18 as the pack emerges from the rolls. No time-consuming measurements need be made and production is not interfered with in any way.

While it is impossible, for obvious practical reasons, to position the flag switch 23 at the exact center of the roll pass, this fact is not material since, with the automatic feeding and catching tables above mentioned, the pack travels at the same speed before entering and after leaving the rolls as it does while between the rolls. Other types of switches could be employed, for example, one actuated by the elevation of the top roll upon the entrance of the pack between the rolls.

The switch 23 is preferably not closed by reverse movement of the pack over the top roll of the mill 10, although reclosure of the switch may be desirable to repeat the indication of the pack length in case the roller failed to note the indicator on the emergence of the pack from the mill. As an alternative, the indicator might be provided with an idler needle actuated in the forward position by movement of the indicator 18 and reset manually after the completion of the work on any one pack. In this way, the points to which the indicator 18 advances after successive passes would be recorded by the idler needle in case the roller should lose sight of the instantaneous position of the indicator 18 before resetting thereof after each pass.

It will be apparent that the invention described above is characterized by numerous advantages. One of these, and a very important one, is the possibility of calibration of the indicator by the roller to determine what the successive indications should be after each pass. It is impossible, as a practical matter, to permanently calibrate the indicator because of the variations in the diameter and, therefore, the peripheral speed of the mill rolls, and the time necessary for operation of the mechanical equipment after the closure or opening of the flag switch. The indicator is calibrated by the roller, by actually measuring the pack lengths after each pass for at least one pack. The roller knows approximately what magnitude of reductions in gauge are feasible for different classes of products and by measuring the pack lengths after each pass, the markers 30 can be adjusted around the rim of the dial 27 to serve as a guide for the screwdown adjustments prior to successive passes for all the other packs. After the first calibration, of course, slight corrections either way in the marker settings may be made if subsequent observation indicates that recalibration is advisable. During the progress of a particular order through the finishing mill, furthermore, an occasional check by actually measuring a finished pack length will be sufficient protection against cumulative errors.

The possibility of recalibration is also important when it is considered that the maximum length of packs differs with different conditions of the contour of the roughing mill rolls. This contour changes very slowly and, since packs are finished in the order in which the breakdowns are rolled, the change may be compensated for by recalibration, as above described. Figure 7, for example, illustrates the shape of a pack for a certain contour of the roughing rolls. The dimension A, of course, represents the maximum usable length of the pack and this dimension must conform to the required finished length of the pack. The flag switch controlling the indicator is preferably closed until the extreme end of the pack has passed thereover because the trailing end must clear the roll surface on tilting of the catching table. If the packs have the shape shown in Figure 7, therefore, the roller must see that his indicator registers a greater length than is actually required of the finished pack by the difference between the dimension A of Figure 7 and the maximum length of the pack there shown.

Figure 8 illustrates a pack resulting from a change in the shape of the roughing mill roll contour. The dimension B in Figure 8 indicates the maximum usable length of the pack but the maximum actual length of the pack is somewhat greater. As before stated, the roller can compensate for this by proper allowance in the calibration of the indicator dial.

Whether the indicator will show the usable length of the pack or the actual length of the pack, of course, depends upon where the switch-actuating finger engages the pack, that is, whether at the center or at the edges.

Other obvious advantages of the invention include the fact that it avoids the loss of time necessary for actual measurement of the packs with a measuring rod. In addition, the chance of rolling a pack deficient in length is practically eliminated so that the necessity for shearing a pack into sheets of a size next below that called for by the order being rolled is avoided. Over-elongation is likewise avoided and the scrap loss is decreased, with a corresponding increase in the tonnage yield of salable product.

Although I have illustrated and described herein but a single preferred embodiment of the invention, it will be recognized that numerous changes in the details of the invention disclosed may be made without departing from the scope of the appended claims. While the invention has been described with reference to the measurement of packs of sheets being rolled, it is obvious that it may also be utilized for the measurement of other types of material during movement thereof.

I claim:

1. Apparatus for measuring the length of continuously advancing packs comprising an indicator, a drive shaft therefor, means for driving said shaft at a speed proportional to that of the pack, a clutch on said shaft for engaging said indicator, a clutch shifting magnet, a flag switch operable by engagement of a pack therewith for controlling said magnet, and means rendered effective on movement of the indicator to restore it to initial position when released by the clutch.

2. The combination with a rolling mill having work rolls and driving mechanism therefor, of an indicator, a driving shaft, connectible to said indicator, means for driving said shaft at a speed proportional to that of the mill, means actuated by the material in its passage through the mill for connecting said shaft to said indicator for a time proportional to the length of the material, and means rendered effective on movement of the indicator to restore it to its initial position when disconnected from the driving shaft.

3. The combination with a rolling mill, of means for indicating the length of material passing therethrough, comprising an indicator, means controlled by the passing material for actuating said indicator for a time proportional to the length of the material, and means effective on said indicator continuously, to return it to its initial position after each operation by said actuating means.

4. A measuring device for strip material comprising an indicator, continuously driven means for actuating said indicator, a clutch for connecting said actuating means to the indicator, means actuated by the passage of material past a predetermined point for causing engagement of said clutch, and means effective continuously to reset the indicator at its initial position on disengagement of the clutch.

5. The combination with a rolling mill, of means for indicating the length of material passing therethrough, comprising an indicator and a shaft for actuating said indicator, means controlled by the passing material for actuating said shaft for a time proportional to the length of the material, and means effective on said shaft continuously, to return it to its initial position after each operation by said actuating means.

ARCHIBALD D. EVANS.